(12) United States Patent
Jackson

(10) Patent No.: US 7,379,542 B2
(45) Date of Patent: May 27, 2008

(54) METHODS AND SYSTEMS FOR REMOTE MANAGEMENT OF NETWORKED DEVICES

(75) Inventor: Stephen S. Jackson, Chapel Hill, NC (US)

(73) Assignee: Hatteras Networks, Durham, NC (US)

( * ) Notice: Subject to any disclaimer, the term of this patent is extended or adjusted under 35 U.S.C. 154(b) by 1072 days.

(21) Appl. No.: 10/357,307

(22) Filed: Feb. 3, 2003

(65) Prior Publication Data

US 2003/0149767 A1 Aug. 7, 2003

Related U.S. Application Data

(60) Provisional application No. 60/354,231, filed on Feb. 4, 2002.

(51) Int. Cl.
*H04M 11/00* (2006.01)

(52) U.S. Cl. .............................. 379/102.04; 379/106.01

(58) Field of Classification Search ........... 379/102.01, 379/102.04, 106.01, 106.11, 26.01, 27.01, 379/93.07
See application file for complete search history.

(56) References Cited

U.S. PATENT DOCUMENTS

| | | | | |
|---|---|---|---|---|
| 6,599,038 | B1* | 7/2003 | Henderson | 398/17 |
| 2001/0056503 | A1* | 12/2001 | Hibbard | 709/250 |
| 2002/0073434 | A1* | 6/2002 | Pience | 725/119 |

\* cited by examiner

*Primary Examiner*—Stella L Woo
(74) *Attorney, Agent, or Firm*—Myers Bigel Sibley & Sajovec, P.A.

(57) ABSTRACT

A remote device includes a device unit having a communications network interface. A management module is in communication with the device unit, and the management module is connectable to a powered copper network. The management module operates a management communications channel over the powered copper network and receives power from the powered copper network.

37 Claims, 4 Drawing Sheets

METHODS AND SYSTEMS FOR REMOTE MANAGEMENT OF NETWORKED DEVICES

RELATED APPLICATION

This application claims the benefit of U.S. Provisional Application No. 60/354,231, filed Feb. 4, 2002, the disclosure of which is incorporated herein by reference in its entirety as if set forth fully herein.

FIELD OF THE INVENTION

This invention relates generally to the management of remote networked devices.

BACKGROUND OF THE INVENTION

Conventional copper telecommunications infrastructures exist in most countries to provide public telephony services. In addition to communications services provided by the copper infrastructure, a small power source is provided over the copper network to telephony equipment.

Additional networks may be deployed over more recently developed media types such as fiber optics, wireless networks, and satellite communications. These new media networks typically terminate at or near the end user's location. The media service provider can use a demarcation device that signifies the edge of the service provider's management domain. The demarcation device may be a simple device, but it can also be an important networking tool because it is often the last device that can be controlled or monitored by the service provider.

Remote management and/or device failures usually result in the dispatchment of a technician to manually service a remote device. These repair procedures can be costly and time consuming. Demarcation devices may be the most numerous element in a communications network system, and reliable management and monitoring of the devices may decrease the cost to the service provider and increase the reliability of service to the end user.

Currently, demarcation devices may be managed and monitored through the same communications channels as the communications services that are being provided. That is, the management and monitoring data is communicated to remote monitoring stations via the same physical link as the communication services. As a result, the management and monitoring abilities may be limited by the reliability of the communications services and the network through which the services are provided. In addition, the management of a remote device may be intricately tied to a local power source at the remote device, and the device typically cannot be monitored or diagnosed if local power to the device is interrupted. Furthermore, the service provider may not be able to differentiate transient power source failures from a network failure or from a device failure because in each case, the remote device is likely to be unreachable. However, the action required to repair each type of failure may be different, and the service provider may not be able to easily determine the most likely cause of the failure.

For example, referring to FIG. 1, a typical prior art communications network includes remote devices 13 that are connected to the communications infrastructure 15 by connections 19. The remote devices 13 can be demarcation devices at or near an end user and are powered by a local power supply such as a battery. The communications infrastructure 15 can be an infrastructure for various media types such as fiber optics, wireless networks, and satellite communications. Management stations 11 monitor the remote devices 13, and can be physically removed from the remote devices 13.

The communications infrastructure 15 may overlap with a powered copper network 17 if the communications infrastructure 15 includes copper communications. The powered copper network 17 can be a plain old telephone system (POTS).

Communications services are provided by the communications infrastructure 15 via the connections 19 to the remote devices 13. Management and monitoring data also flow through the same communications infrastructure 15 via connections 19 to the remote devices 13. As discussed above, the monitoring functions of the management stations 11 are only as reliable as the communications infrastructure 15 and connections 19.

SUMMARY OF THE INVENTION

The present invention is directed to remote devices and devices, systems, and methods for managing remote devices. In certain embodiments, a remote device includes a device unit having a communications network interface. A management module is in communication with the device unit, and the management module is connectable to a powered copper network. The management module operates a management communications channel over the powered copper network and receives power from the powered copper network.

In this configuration, the reliability of management and monitoring functions in a network can be increased. Management communications may be provided over both the powered copper network and the communications network such that the reliability of the management communications may not be limited by the reliability of the communications network. In some embodiments, the powered copper network can supply power to the management module so that management data may be communicated to a remote management station even in the event of a local power failure of the remote device.

In other embodiments, a communications system is provided, including a communications network, a powered copper network, and a remote device as described above.

In still further embodiments, methods of managing a remote device such as the device described above are provided. The remote device is monitored from a management station physically remote from the remote device. The management station communicates with the remote device via both the powered copper network and a communications network. In response to a failure of the communications network, monitoring can be continued via the powered copper network.

DETAILED DESCRIPTION OF EMBODIMENTS OF THE INVENTION

The present invention will now be described more particularly hereinafter with reference to the accompanying drawings, in which preferred embodiments of the invention are shown. The invention, however, may be embodied in many different forms and is not limited to the embodiments set forth herein; rather, these embodiments are provided so that the disclosure will fully convey the scope of the invention to those skilled in the art. Like numbers refer to like components throughout.

Figure 1:
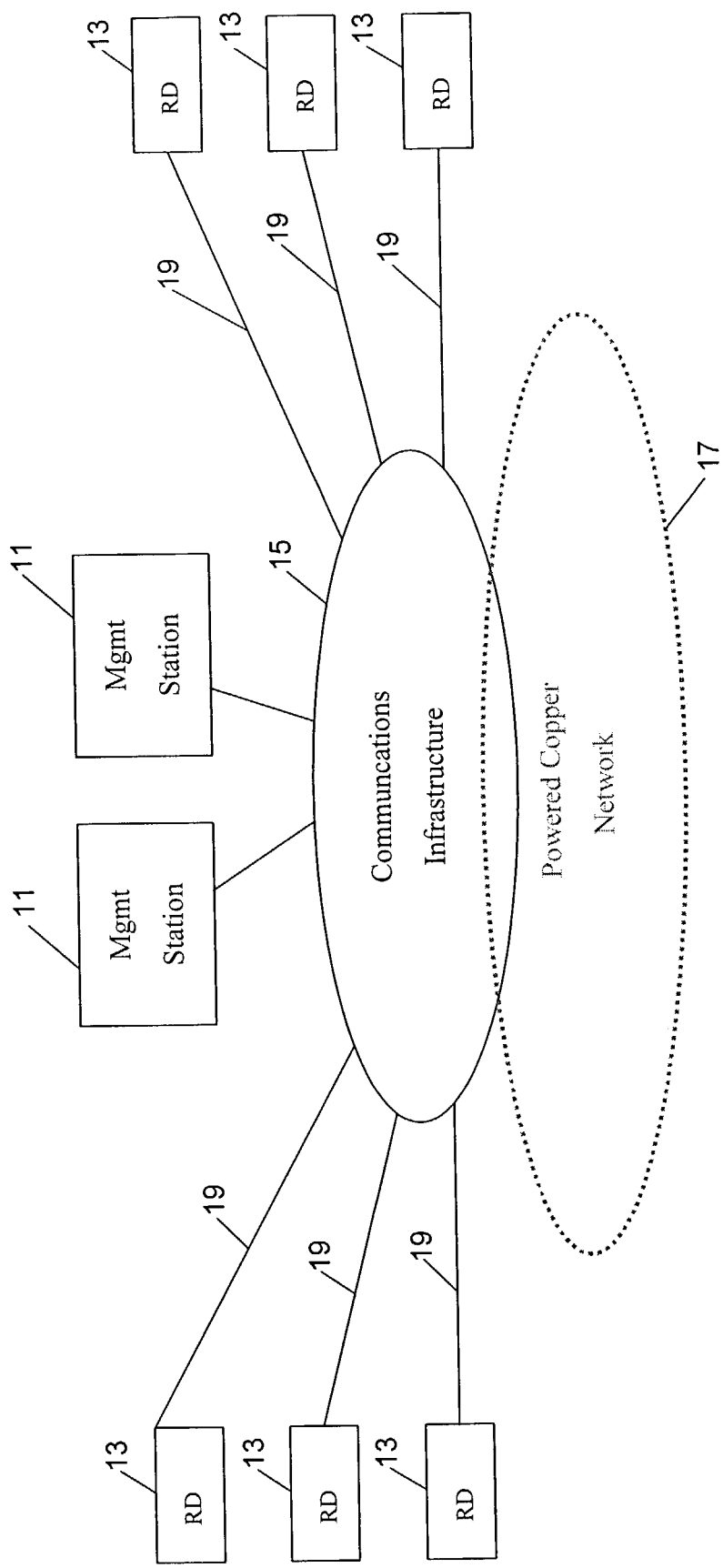
FIG. 1 is a schematic diagram of a prior art communications system.
Figure 2:
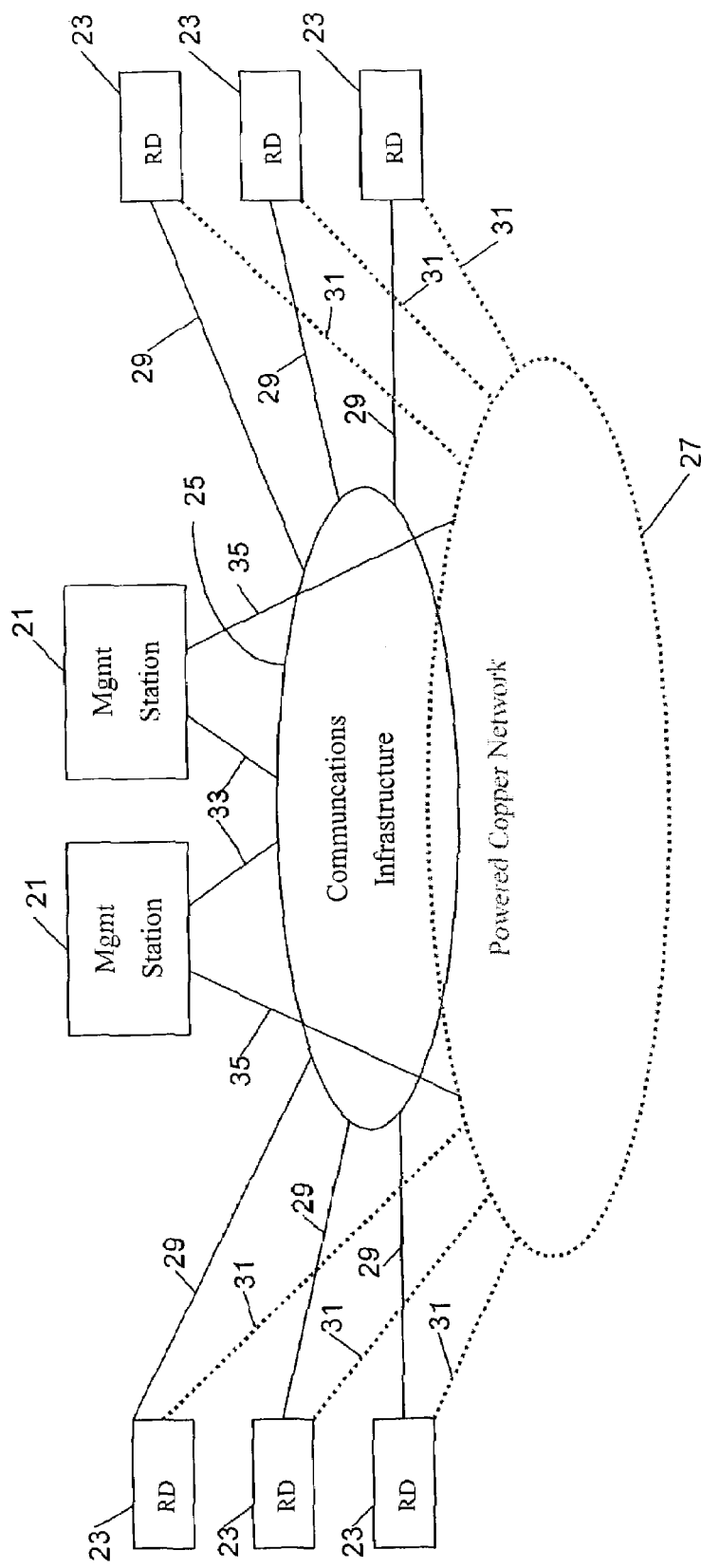
FIG. 2 is a schematic diagram of a communications system according to embodiments of the invention.

Referring to FIG. 2, a communications infrastructure 25 according to embodiments of the present invention is illustrated, and communicates with remote devices 23 by connections 29. Management stations 21 are provided to monitor the remote devices 23. The remote devices 23 can be demarcation devices provided at the end of a network, such as routers used in communications networks. A remote device can include a firewall, a network address translator, or a bridge. The communications infrastructure 25 can include fiber optic, wireless, satellite, and wired communications networks. The management stations 21 can be physically remote from the remote devices 23. For example, one or more management stations 21 may be located in a central office or regional center for monitoring a relatively large number of remote devices 23. The remote devices 23 and management stations 21 can be separated by large distances. In the illustrated embodiment, the communications infrastructure 25 overlaps with a powered copper network 27 so that communications can pass between the communications infrastructure 25 and the powered copper network 27. One example of a powered copper network 27 is a plain old telephone system (POTS).

The remote devices 23 can also communicate with the powered copper network 27 by connections 31. Connections 31 may be copper cable connections. The remote devices 23 typically have local power supplies. However, the powered copper network 27 provides an additional power supply via connections 31. Connections 33 provide communications between the communications infrastructure 25 and the management stations 21, and connections 35 provide communications between the powered copper network 27 and the management stations 21. Therefore, the management stations 21 can monitor the remote devices 23 using either the communications infrastructure 25 (via connections 33 and 29) or by way of the powered copper network 27 (via connections 35 and 31). If there is a failure of the communications infrastructure 25, monitoring may continue via the powered copper network 27.

The present invention increases the reliability of monitoring functions performed by the management stations 21 and makes it easier to isolate causes of failures. For example, according to the present invention, the monitoring stations 21 are able to determine whether a failure has occurred with the local power supply (at the remote device 23), in the communications infrastructure 25 or at one of the remote devices 23. Power supplied to the remote devices 23 by the connections 31 to the powered copper network 27 increases reliability. If a local power supply at one of the remote devices 23 fails, monitoring activity can continue using the power supplied by the connections 31 from the powered copper network 27.

In some embodiments of the present invention, a single cable provides connections 29 and 31. For example, if the communications infrastructure 25 is a fiber optics network, the connections 29 and 31 can be provided by a hybrid fiber optics-copper cable.

Figure 3:
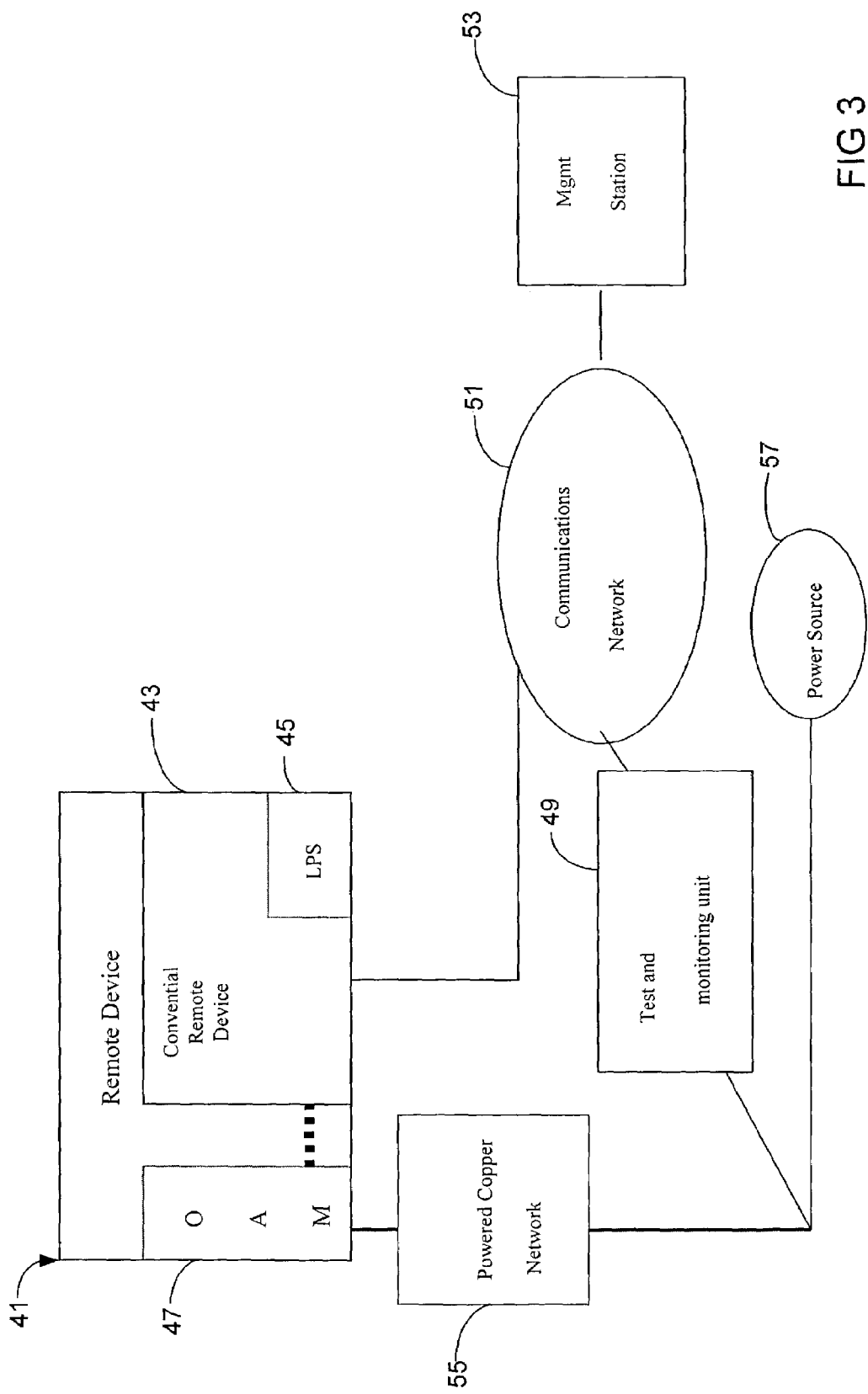
FIG. 3 is a schematic diagram of a remote device and network connections according to embodiments of the invention.

Referring to FIG. 3, a remote device 41 according to embodiments of the present invention includes the components of a conventional remote device 43, a local power source 45, and an operations, administration and management module ("management module") 47. The conventional remote device 43 is connected to a communications network 51. A management station 53 monitors the remote device 41 via the communications network 51. The management module 47 may be integrated with the remote device 41 as shown or it may be added a conventional remote device 43 as a separate component. Communications between the management module 47 and the conventional remote device 43 may be embodied in different configurations, including, but not limited to, the management module 47 having access to registers or memory of the conventional remote device 43, the conventional remote device 43 having access to registers or memory on the management module 47, or an interface that passes messages between the conventional remote device 43 and the management module 47.

In the illustrated embodiment, the management module 47 connects to a powered copper network 55. A power source 57 may be utilized to supply additional power and/or backup power to the management module 47 via the powered copper network 55. In some embodiments of the present invention, the management module 47 is supplied with sufficient power from the power source 57 to operate independently of the conventional remote device 43. Therefore, if the power from the power supply 57 is insufficient to operate the conventional remote device 43 and in the event of a failure of the local power source 45, the management module 47 can continue its management operations.

In the illustrated embodiment, testing and monitoring unit 49 is connected to the powered copper network 55 for testing the remote device 41, for example, via the management module 47. The testing and monitoring unit 49 can communicate management data to a management station 53 by way of the communications network 51.

Figure 4:
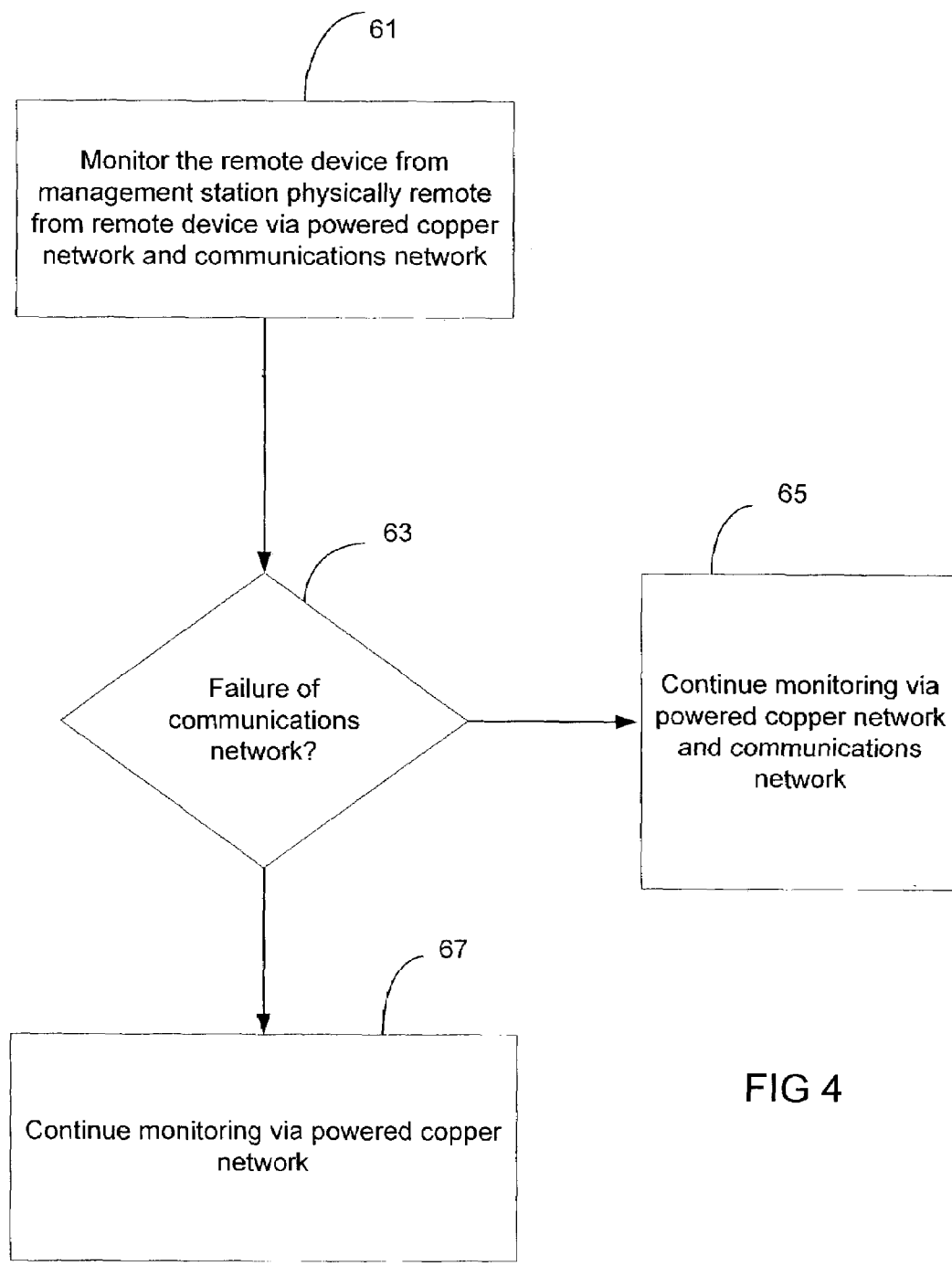
FIG. 4 is a flow diagram illustrating operations for managing a remote device according to embodiments of the invention.

With reference to FIG. 4, operations according to embodiments of the invention that can be carried out using the configurations shown in FIGS. 2 and 3 are shown. A remote device can be monitored from a management station that is physically remote from the remote device (Block 61). The management station can communicate with the remote device via both a communications network and a powered copper network. If there is a failure of the communications network (Block 63), the system can continue monitoring the remote device via the powered copper network (Block 67). Absent a failure of the communications network (Block 63), the system can continue monitoring via both the powered copper network and the communications network (Block 65).

Referring again to FIG. 3, the management module 47 is optionally a subcomponent of the hardware that includes the remote device 41. Alternatively, the remote device 41 integrates the functionality of the management module 47 in a single unit. The management module 47 can receive its operating power from a copper loop attachment to the powered copper network 55 and in addition to or instead of from the local power source 45. In this configuration, the management module 47 may operate independently of the conventional remote device 43 and can continue management operations in the event of a failure of the remote device 41 or the local power source 45. In some embodiments, the management module 47 can receive power from the local power source 45, for example, on an auxiliary basis if power is not received from the powered copper network 55.

According to an embodiment of the present invention, the management module 47 is configured to interrogate the operating status of the conventional remote device 43. The interrogation of the operating status can be conducted via any of several methods, including methods known to those of skill in the art, such as by way of a current modulated data signal. The result of the operating status interrogation can then be relayed to power source equipment such as the management station 53 via any of several methods, including methods known to those of skill in the art, for example, a current modulated data signal. The relayed information is associated with the conventional remote device 43 based on a unique copper loop path connection.

Optionally, the management module 47 may be able to output a signal or signals the conventional remote device 43. For example, such signals could initiate a reset or other change of state or control variable. The output signal may include any of several mechanisms known to those of skill in the art, for example, a contact closure or open-collector or open-source transistor interface. In some embodiments, if the management module 47 fails to draw a predetermined minimum power from the power source 57, the management station 53 can determine that the copper loop connection is broken.

The foregoing embodiments are illustrative of the present invention, and are not to be construed as limiting thereof. The invention is defined by the following claims, with equivalents of the claims to be included therein.

That which is claimed is:

1. A remote device comprising:
a device unit having a communications network interface;
a management module in communication with the device unit, the management module being connectable to a powered copper network; and
wherein the management module operates a management communications channel over the powered copper network and receives power from the powered copper network and the management module receives sufficient power from the powered copper network to interrogate the operating status of the device.

2. The remote device of claim 1, wherein the device unit receives power from a local power source independent from the powered copper network.

3. The remote device of claim 1, wherein the device unit communicates monitoring informant ion to the management module.

4. The remote device of claim 1, wherein the management module interrogates the device unit to determine operating status.

5. The remote device of claim 4, wherein the management module interrogates the device unit using a current modulated data signal.

6. The remote device of claim 1, wherein the management module outputs a signal to the device unit.

7. The remote device of claim 6, wherein the signal initiates a change of state in the device unit.

8. The remote device of claim 6, wherein the signal initiates a change in a control variable in the device unit.

9. The remote device of claim 1, wherein the powered copper network comprises a plain old telephone system (POTS).

10. A communications system comprising:
a communications network;
a powered copper network; and
a remote device comprising:
a device unit having a communications network interface; and
a management module in communication with the device unit and connected to the powered copper network;
wherein the management module operates a management communications channel over the powered copper network and receives power from the powered copper network and the management module receives sufficient power from the powered copper network to interrogate the operating status of the device.

11. The communications system of claim 10, further comprising a management station in communication with the management module via both the powered copper network and the communications network, wherein the management station can remotely manage the remote device via the communications network and the powered copper network.

12. The communications system of claim 10, further comprising a testing unit in communication with the powered copper network for testing the remote device.

13. The communications system of claim 10, wherein the device unit receives power from a local power source independent from the powered copper network.

14. The communications system of claim 10, wherein the remote device is configured to communicate monitoring information to the management module.

15. The communications system of claim 10, wherein the management module interrogates the remote device to determine operating status.

16. The communications system of claim 10, wherein the management module interrogates the remote device using a current modulated data signal.

17. The communications system of claim 10, wherein the management module outputs a signal to the remote device.

18. The communications system of claim 17, wherein the signal initiates a change of state in the remote device.

19. The communications system of claim 17, wherein the signal initiates a change in a control variable in the remote device.

20. The communications system of claim 10, wherein the powered copper network is a plain old telephone system (POTS).

21. The communications system of claim 10, wherein the communications network comprises a fiber optic network.

22. The communications system of claim 10, wherein the communications network comprises a wireless network.

23. The communications system of claim 10, wherein the communications network comprises a satellite network.

24. A method of managing a remote device, wherein the remote device comprises: a device unit having a communications network interface; a management module in communication with the device unit, the management module being connectable to a powered copper network; and wherein the management module operates a management communications channel over the powered copper network and receives power from the powered copper network; the method comprising:
monitoring an operating status of the remote device from a management station physically remote from the remote device, wherein the management station communicates with the remote device via both the powered copper network and a communications network; and
in response to a failure of the communications network, continuing monitoring via the powered copper network.

25. The method of claim 24, further comprising communicating monitoring information from the remote device to the management module.

26. The method of claim 24, further comprising interrogating the remote device to determine operating status.

27. The method of claim 26, further comprising communicating the operating status of the remote device to the management station.

28. The method of claim 24, further comprising providing a signal to the remote device from the management module, wherein the signal provides instructions for the remote device to change state.

29. The method of claim 24 further comprising providing a signal to the remote device from the management module, wherein the signal provides instructions for the remote device to change a control variable.

30. The method of claim 24, further comprising providing power to the remote device with a local power supply.

31. The device of claim 1, wherein the management module receives sufficient power from the powered copper network to operate the management communications channel.

32. The communications system of claim 10, wherein the management module receives sufficient power from the powered copper network to operate the management communications channel.

33. The method of claim 24, wherein the management module receives sufficient power from the powered copper network to operate the management communications channel.

34. The method of claim 24, wherein the management module receives sufficient power from the powered copper network to interrogate the operating status of the device.

35. The method of claim 1, wherein the device comprises a demarcation device that signifies the edge of a service provider's management domain.

36. The communications system of claim 10, wherein the device comprises a demarcation device that signifies the edge of a service provide's management domain.

37. The method of claim 24, wherein the device comprises a demarcation device that signifies the edge of a service provider's management domain.

* * * * *

UNITED STATES PATENT AND TRADEMARK OFFICE
CERTIFICATE OF CORRECTION

PATENT NO.         : 7,379,542 B2                                              Page 1 of 1
APPLICATION NO.    : 10/357307
DATED              : May 27, 2008
INVENTOR(S)        : Jackson It is certified that error appears in the above-identified patent and that said Letters Patent is
hereby corrected as shown below:

Column 5, Claim 3, Line 47: Please correct "informant ion"
                                       To read -- information --

Signed and Sealed this

Nineteenth Day of August, 2008

JON W. DUDAS
*Director of the United States Patent and Trademark Office*